June 15, 1926.
H. B. PAGE
MOVABLE HEADLIGHT
Filed Dec. 1, 1924
1,589,216
2 Sheets-Sheet 1
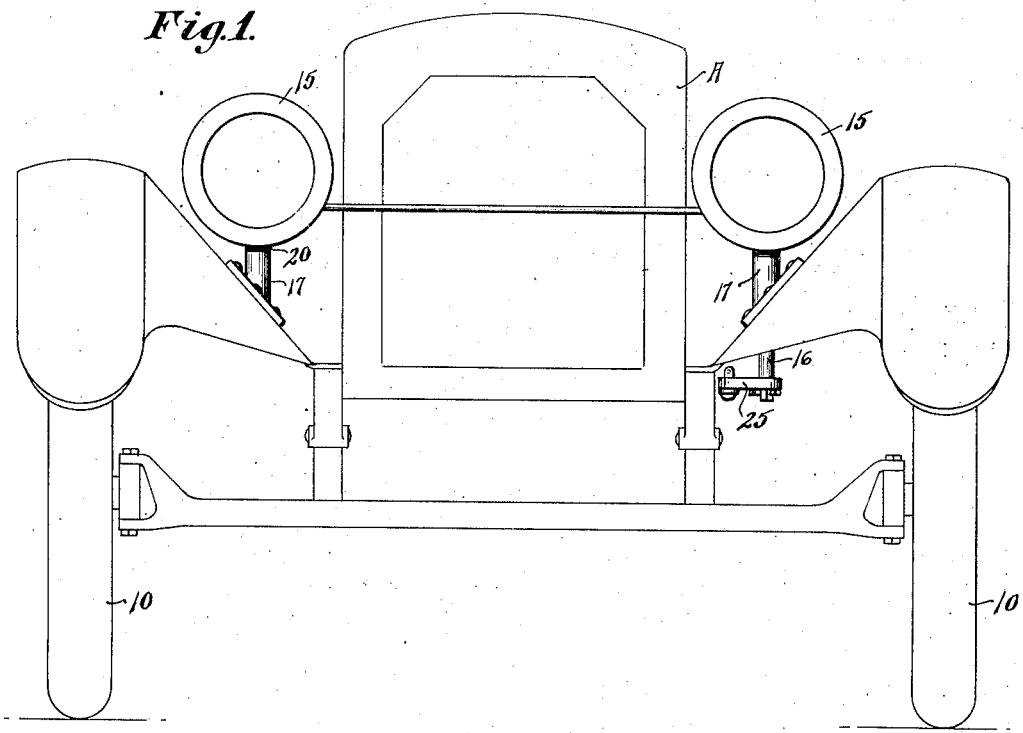
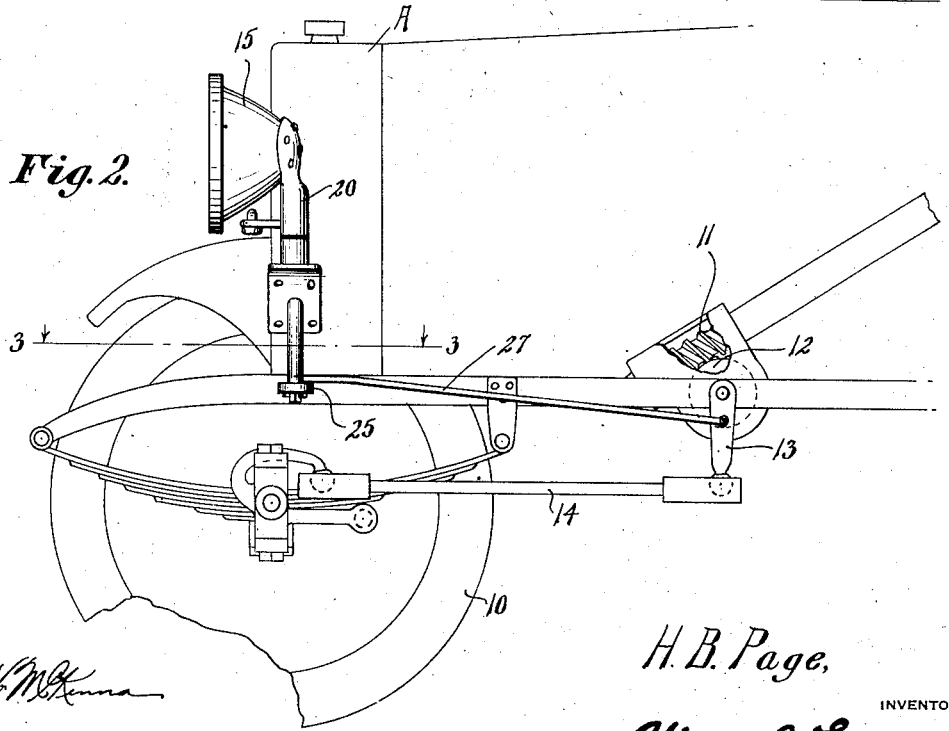

June 15, 1926.

H. B. PAGE

MOVABLE HEADLIGHT

Filed Dec. 1, 1924

H. B. Page,
INVENTOR

Patented June 15, 1926.

1,589,216

UNITED STATES PATENT OFFICE.

HENRY BENJIMAN PAGE, OF DELHI, LOUISIANA.

MOVABLE HEADLIGHT.

Application filed December 1, 1924. Serial No. 753,325.

This invention relates to motor operated vehicles, and has particular application to the manner of mounting the headlamps for turning movement in either direction, together with means for controlling said lamps incident to the steering of the machine, so that the light rays will always be maintained directly in advance of the machine when turning corners or curves, to properly illuminate the course being pursued by the vehicle.

The nature and advantages of the invention will be better understood when the following detailed description is read in connection with the accompanying drawings, the invention residing in the construction, combination and arrangement of parts as claimed.

Figure 1 is a front elevation of an automobile showing the application of the invention.

Figure 2 is a fragmentary side elevation.

Figure 5 is a view showing a modified form.

Figure 3:
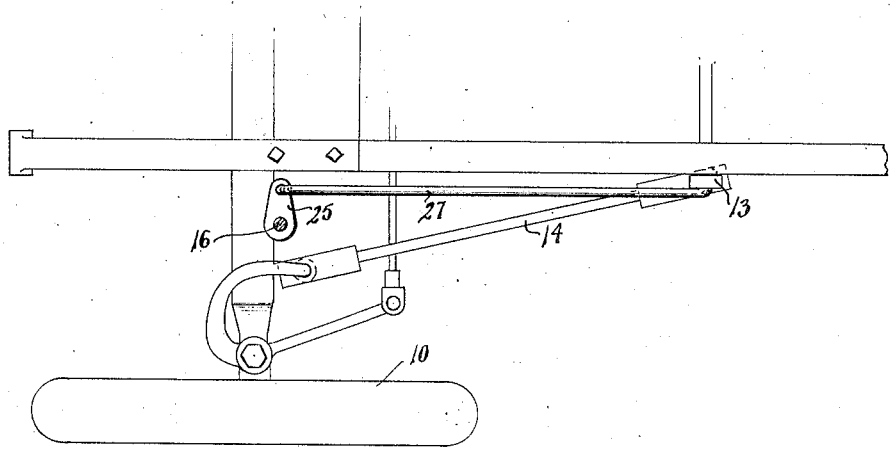
Figure 3 is a sectional view taken on line 3—3 of Figure 2.

Referring to the drawings in detail, A indicates generally a portion of a motor operated vehicle of any well known construction, wherein the front wheels 10 are turned to guide the machine by means of a steering mechanism of ordinary construction. This mechanism usually includes a steering post 11 which is geared to a worm gear 12, while depending from the shaft of the gear 12 is a crank arm 13. The crank arm is of course connected with one of the steering knuckles by means of a connecting rod 14. Also this mechanism is of well known construction and does not form any part of the present invention, but is utilized in connection therewith in order to control the movements of the headlamps.

Figure 4:
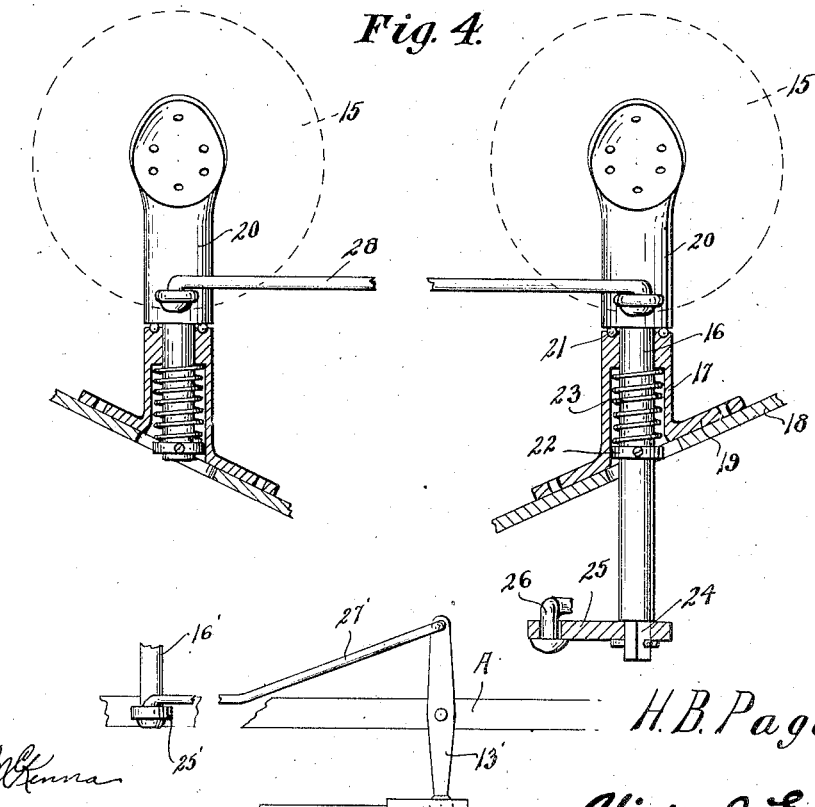
Figure 4 is a view partly in section showing how the headlamps are mounted.

Each headlamp is indicated at 14 and includes a post 16 which is received by a tubular member 17 bolted or otherwise suitably secured to an appropriate part of the machine indicated at 18. Each tubular member is provided with an attaching flange 19 for this purpose. The post 16 of each lamp is formed with an enlarged portion 20 which reposes upon the tubular member 17, and interposed between these parts are ball bearings or the like 21. Each post is also provided with a collar 22, and surrounding the post and having one end bearing against this collar is a spring 23 which serves to hold the enlarged portion 20 of each post extended upon the frictional bearings 21. As will be noted upon inspection of Figure 4, each of these springs 23 is housed within the adjacent tubular member 17. The post 16 for one headlamp projects an appreciable distance beneath the fender or part of the machine with which it is associated, and terminates to provide a squared extremity 24. An apertured lug 25 is attached to the squared extremity 24 of said post, the aperture of said lug receiving the offset extremity 26 of a rod 27, the other end of which is adapted to be attached to the crank arm 13 forming part of the steering mechanism. It is by reason of this construction and arrangement of parts, that the headlamps are turned simultaneously with the turning of the front wheels 10 incident to the steering of the vehicle, so as to maintain the light rays from said lamps directly in advance of the machine at all times. Of course the headlamps are connected together by means of a transverse rod 28, so that both lamps are simultaneously turned, although only one of said lamps is directly connected with the steering mechanism.

In Figure 5, I have shown a modified form of the invention wherein it will be noted that the arm 13' is of a length to extend above the frame A, and has its upper end connected with the adjacent end of the rod 27' which provides a connection between the arm and the adjacent lamp post 16'. This post is provided with a lug 25' which projects from the outer side of the lamp post, in contra-distinction to the arrangement of the lug 25 in the preferred form of the invention as shown in Figure 3, the lug 25' being apertured for connection with the adjacent end of the rod 27'. By reason of this arrangement, the rod 27' moves in directions directly opposite the movement of the rod 27 accomplishing the same result.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

In combination, a support, a headlamp including a post mounted for rotation on said support, said support having an opening through which a portion of the post projects, a hollow tubular member surrounding said post, a flange formed on the lower end of the tubular member and adapted to be attached to said support, an enlarged portion formed on the upper end of the post and reposing upon said tubular member, the upper end of said member being provided with an annular groove, ball bearings arranged in said groove and held therein by the enlarged portion of the post, a collar carried on the post and arranged adjacent the lower end of the tubular member, a coil spring surrounding the post and bearing against one end of the tubular member and the collar respectively and holding said parts in operative relation and also preventing rattling of the lamp, and means connected with the lower end of the post for turning the headlamp.

In testimony whereof I affix my signature.

HENRY BENJIMAN PAGE.